US009422026B1

(12) United States Patent
Cody

(10) Patent No.: US 9,422,026 B1
(45) Date of Patent: Aug. 23, 2016

(54) TOOTHED SPROCKET WITH ELASTIC CENTERING ELEMENT

(71) Applicant: GATES CORPORATION, Denver, CO (US)

(72) Inventor: Michael Cody, Boulder, CO (US)

(73) Assignee: Gates Corporation, Denver, CO (US)

(*) Notice: Subject to any disclaimer, the term of this patent is extended or adjusted under 35 U.S.C. 154(b) by 63 days.

(21) Appl. No.: 14/622,057

(22) Filed: Feb. 13, 2015

(51) Int. Cl.
F16D 3/00 (2006.01)
F16H 55/14 (2006.01)
F16H 55/36 (2006.01)
F16H 55/30 (2006.01)
F16H 55/12 (2006.01)
B62M 9/02 (2006.01)

(52) U.S. Cl.
CPC ............... B62M 9/02 (2013.01); F16H 55/30 (2013.01); F16H 2055/306 (2013.01)

(58) Field of Classification Search
CPC ........ B62M 9/10; F16D 41/12; Y10T 74/214; B25B 27/0071; B60B 27/023
USPC ........................................... 474/94, 152, 160
See application file for complete search history.

(56) References Cited

U.S. PATENT DOCUMENTS

| 4,125,074 | A | * | 11/1978 | Sato | B65C 11/004 |
| | | | | | 101/228 |
| 4,311,473 | A | * | 1/1982 | Sugimoto | B62M 9/10 |
| | | | | | 192/64 |
| 4,429,448 | A | * | 2/1984 | Butz | B25B 27/0071 |
| | | | | | 29/281.5 |
| 4,570,769 | A | * | 2/1986 | Isaka | F16D 41/12 |
| | | | | | 192/107 T |
| 5,000,721 | A | * | 3/1991 | Williams | F16D 7/048 |
| | | | | | 192/46 |
| 5,088,581 | A | * | 2/1992 | Duve | F16D 41/12 |
| | | | | | 192/107 M |
| 5,355,979 | A | * | 10/1994 | Stephan | E05F 3/14 |
| | | | | | 188/290 |
| 5,701,785 | A | * | 12/1997 | Liu | F03G 1/08 |
| | | | | | 185/39 |

(Continued)

FOREIGN PATENT DOCUMENTS

| CN | 203438771 U | 2/2014 |
| DE | 4344151 A1 | 6/1995 |
| DE | 202007010448 U1 | 9/2007 |

OTHER PUBLICATIONS

European Patent Office, International Search Report PCT/US2013/023068, Mailing date Apr. 10, 2013.

(Continued)

Primary Examiner — Henry Liu
(74) Attorney, Agent, or Firm — Jeffrey A. Thurnau, Esq.; Paul N. Dunlap, Esq.

(57) ABSTRACT

A toothed sprocket hub with elastic centering element comprising an input shaft having a receiving portion and a cylindrical outer surface, a sprocket engagable with the input shaft, the sprocket comprising at least two first surfaces each disposed on a bending beam such that each first surface is elastically moveable in a radial direction, the two first surfaces bearing upon the outer surface, the two first surfaces each having a radius d that is less than a radius D of the outer surface, at least one second surface that is radially moveable to a lesser extent than a first surface, the second surface engaging the receiving portion to prevent a relative rotation of the sprocket with the input shaft, and a third surface in cooperative relation to the second surface, the third surface bearing upon the outer surface of the input shaft, the third surface having a clearance fit with the outer surface.

7 Claims, 5 Drawing Sheets

(56) References Cited

U.S. PATENT DOCUMENTS

| | | | | |
|---|---|---|---|---|
| 5,782,712 A * | 7/1998 | Campagnolo | ............ | B62M 9/00 474/152 |
| 6,148,979 A * | 11/2000 | Roach | .................... | F16D 41/12 192/45.1 |
| 7,131,656 B2 * | 11/2006 | Valle | ........................ | B62M 9/10 280/260 |
| 8,336,400 B2 * | 12/2012 | Lassanske | ........... | B60B 27/0068 73/862.29 |
| 8,360,911 B2 * | 1/2013 | Braedt | .................... | B62M 9/10 474/164 |
| 9,168,976 B1 * | 10/2015 | Earle | ........................ | B62M 9/10 |
| 2004/0070166 A1 * | 4/2004 | Valle | ........................ | B62M 9/10 280/260 |
| 2007/0054770 A1 * | 3/2007 | Valle | ........................ | B62M 9/10 474/160 |
| 2007/0254758 A1 * | 11/2007 | Chen | ..................... | B60B 27/023 474/160 |
| 2008/0058144 A1 * | 3/2008 | Oseto | ....................... | B62M 9/10 474/160 |
| 2010/0295265 A1 * | 11/2010 | Burdick | ................. | B62K 19/34 280/261 |
| 2015/0016880 A1 * | 1/2015 | Nicolai | ................... | F16D 1/116 403/364 |

OTHER PUBLICATIONS

European Patent Office, International Search Report PCT/US2016/016489, Mailing date Apr. 13, 2016.

* cited by examiner

TOOTHED SPROCKET WITH ELASTIC CENTERING ELEMENT

FIELD OF THE INVENTION

The invention relates to a toothed sprocket, and more particularly to a toothed sprocket with elastic centering element having a first surface disposed on a bending beam and radially moveable, a second surface radially moveable to a lesser extent that the first surface, and a third surface in cooperative relation to a second surface, the third surface bearing upon the outer surface of the input shaft, the third surface having a clearance fit with the outer surface.

BACKGROUND OF THE INVENTION

Chain drives are the predominant means of power transmission on two-wheelers such as bicycles. Chains are also used for power transmission on numerous machines. Very often, the chain sprockets are connected to a shaft via a form-fitting shaft/hub connection. In general, these and other connections work with local elevations and depressions with respect to a cylinder-shaped connection surface. Some free play fit between the shaft and hub is important for the proper function of these connections. However, under load and if tolerances between the shaft and hub are too large, it can lead to wobbling between the two components. This is considered negative. On the other hand high-quality fits are relatively expensive to manufacture using machining processes. This is a disadvantage when one has to manufacture low-cost mass products.

The chain sprocket is usually thin on affordable bikes with hub gears. This component is typically two to three millimeters wide and is usually a stamped part made of steel and has three or more drive cams with teeth which engage grooves which are located on the input shaft of the hub gear. The fit between these two components is usually a clearance fit. This is necessary in order to employ low-cost manufacturing methods such as sintering, casting or stamping. To prevent the sprocket from moving axially on the input shaft, it is typically held in position by a lock washer or snap ring.

In recent years, many chain drives in automotive technology and general drive technology were replaced by toothed belt drives. Advantages include lower weight, longer service life, less noise and operation without lubricant. Especially in the field of bicycles with hub gears, toothed belt drives according to EP000002289792A1, CA000002749293A1 and U.S. Ser. No. 00/000,7854441B2 are becoming more prevalent.

Because a functioning toothed belt drive requires a defined preload on the belt, a wobbling toothed belt disk on the rear hub would not be able to maintain a constant tension. If the toothed belt disk is not centered and tightly fixed on the rear hub, there can be operating noises as the toothed sprocket moves on the input shaft. The consequence can be squeaking and creaking noises.

Rear hubs with hub gears from all major manufacturers have a centering diameter, which, due to low-cost manufacturing methods, have typical tolerances of plus/minus 0.15 millimeters in the area of the input shaft. If one intends to manufacture inexpensive toothed sprockets without machining by sintering or investment casting, then the manufacturing process requires also bore tolerances in the area of plus/minus 0.15 millimeters. Considering the boundary conditions of the assembly both components can thus be combined only with a certain play. This is the problem of deficient centering when using a toothed sprocket with a spline shaft profile in combination with inexpensively available hub gears.

Means are available to absorb excess tolerance in the component fit between a toothed sprocket and a hub gear. The sprocket relies on a bending beam which absorbs the fit tolerance. The art comprises a sprocket having a first radially movable surface which has a diameter slightly smaller than the hub to which it is mounted. A second surface prevents relative rotation of the parts. Representative of the art is US application serial number US20150016880A1 which discloses a shaft/hub connection for vehicles or for use in drive systems with a cylinder-shaped shaft component, containing elevations or depressions on the lateral surface and a hub component having a bore, including inside the bore also elevations or depressions, whereby the shaft component can be mounted inside the bore of the hub component. It is further distinguished in that inside the bore of the hub component at least 2 surfaces are arranged such that an elastic deformation of these surfaces in the radial direction is possible and inside the bore of the hub component at least 2 surfaces are arranged such that an elastic deformation of these surfaces in the radial direction is less possible. In addition, the shaft/hub connection is characterized in that the elastically deformable surfaces are connected in a materially bonding manner with the elastically less deformable surfaces.

What is needed is a toothed sprocket having a first surface disposed on a bending beam and radially moveable, a second surface radially moveable to a lesser extent that the first surface, and a third surface in cooperative relation to a second surface, the third surface bearing upon the outer surface of the input shaft, the third surface having a diameter greater than the diameter of the outer surface. The present invention meets this need.

SUMMARY OF THE INVENTION

The primary aspect of the invention is a toothed sprocket having a first surface disposed on a bending beam and radially moveable, a second surface radially moveable to a lesser extent that the first surface, and a third surface in cooperative relation to a second surface, the third surface bearing upon the outer surface of the input shaft, the third surface having a diameter greater than the diameter of the outer surface.

Other aspects of the invention will be pointed out or made obvious by the following description of the invention and the accompanying drawings.

The invention comprises a toothed sprocket hub with elastic centering element comprising an input shaft having a receiving portion and a cylindrical outer surface, a sprocket engagable with the input shaft, the sprocket comprising at least two first surfaces each disposed on a bending beam such that each first surface is elastically moveable in a radial direction, the two first surfaces bearing upon the outer surface, the two first surfaces each having a radius d that is less than a radius D of the outer surface, at least one second surface that is radially moveable to a lesser extent than a first surface, the second surface engaging the receiving portion to prevent a relative rotation of the sprocket with the input shaft, and a third surface in cooperative relation to the second surface, the third surface bearing upon the outer surface of the input shaft, the third surface having a clearance fit with the outer surface.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
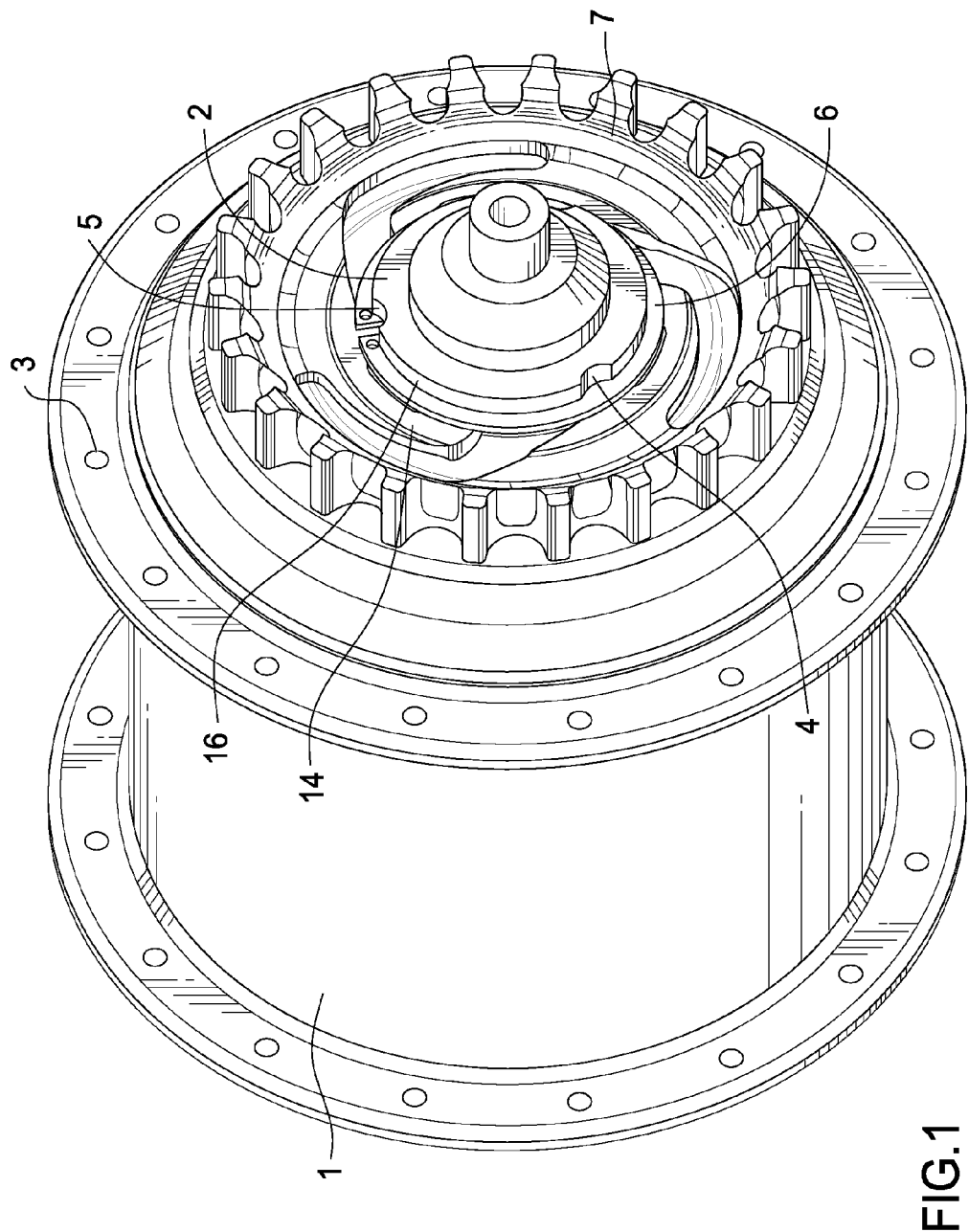
FIG. 1 shows a rear hub of a bicycle without spokes or rim.

FIG. 1 shows a rear hub 1 of a bicycle without spokes or rim. Torque is transmitted to a toothed belt drive via a foot pedal or crank (not shown). The toothed belt transfers torques to the toothed sprocket 7, which in turn drives the input shaft 2.

This arrangement transmits torque via a shaft/hub connection 4 into the hub input shaft. A bicycle rim with tire (not shown) is driven by the rear hub 1 via spokes that are mounted inside the spoke holes 3. This is a known structure on a bicycle wheel. Toothed sprocket 7 is held axially on the input shaft 2 via a snap ring 6.

Sprocket 7 transmits torque via three receiving portions or grooves 5 which are engaged by projections 10. Cylinder-shaped outer surface 16 provides for correct centering of the toothed sprocket 7 on the input shaft 2. However, correct centering is only possible if the bore 9 of toothed sprocket 7 is seated without play in relation to the cylinder-shaped lateral surface 16. This is achieved in the radial direction by elastically movable bending beams 14 and thereby through each surface 12. Each beam surface exerts pressure against surface 16 and in this manner absorb manufacturing tolerances. Each bending beam 14 extends approximately tangentially to the outer surface 16.

Figure 2:
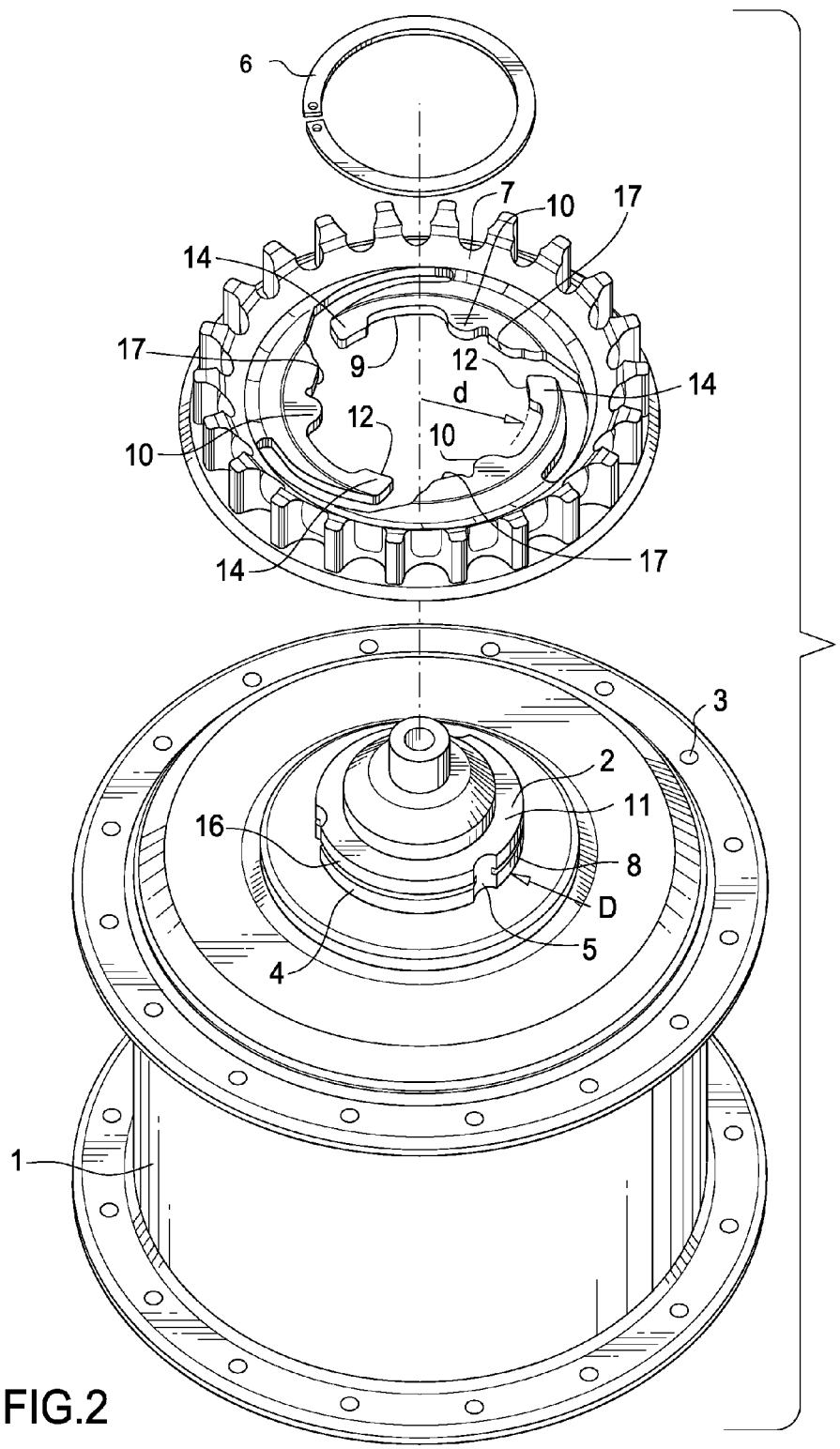
FIG. 2 is an exploded view of FIG. 1.

FIG. 2 is an exploded view of FIG. 1. Input shaft 2 has at a shaft component 11 a shaft/hub connection 4, which transmits torque from the toothed sprocket 7 into the hub input shaft 2. Lock washer 6 is shown in a disassembled state. Grooves 5 on the input shaft 2 are shaped such that projections 10 inside the bore 9 of the toothed sprocket 7 accurately engage therein.

Within bore 9 are disposed three surfaces 12, which are arranged such that an elastic movement of these surfaces in the radial direction is possible. Elastic movement of these three surfaces 12 is achieved through three bending beams 14, which are shaped such that they form the bore 9 with a radius "d". In this embodiment radius "d" of the toothed sprocket 7 disconnected from the input shaft 2 is always less than the shaft radius "D" of surface 16. Each of the three surfaces 12 of the toothed sprocket 7 deform elastically radially outward during assembly and thereby create precise centering of sprocket 7 on input shaft 2. Each bending beam 14 comprises surface 12, which can deform elastically radially, and surface 13. Surface 13 is responsible for the form-fitting torque transmission and cannot deform elastically radially. Bending beams 14 with the elastic movable surfaces 12 form the elastic centering elements of the inventive sprocket.

Figure 3:
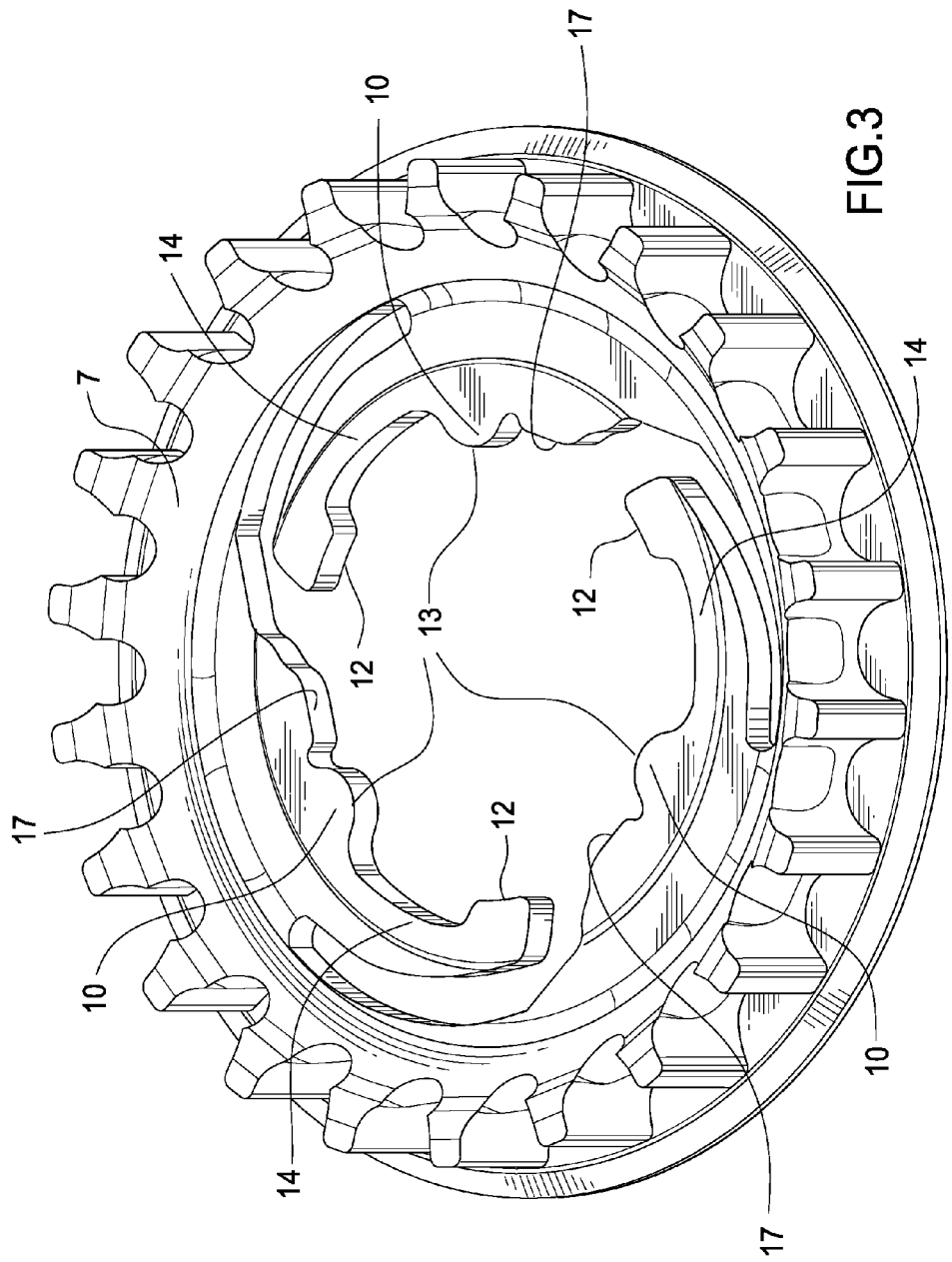
FIG. 3 is an isometric presentation of the embodiment of a toothed sprocket.

FIG. 3 is an isometric presentation of the embodiment of a toothed sprocket 7. Bore surface 9 contacts surface 16 and grooves 5 from FIG. 1 with surface 12, surface 13 and surface 17. Only radial projections 10 with surface 13 are made with a clearance fit with respect to the input shaft 2 of FIG. 2. Surfaces 12 can be considered moveable in terms of radial deformability, because they are connected to the rigid remaining body of the toothed sprocket 7 via bending beam 14. Elastically deformable surfaces 12 of bore 9 are joined with elastically non-deformable surfaces 13. Elastically deformable surfaces 12 are joined with rigid surface 13. Elastically deformable surfaces 12 and the elastically rigid surfaces 13, which contact the input shaft 2 on surface 16, are always smaller in diameter than surface 16.

Each surface 17 bears upon surface 16. Each surface is adjacent to each surface 13. Each surface 13 is disposed between a surface 17 and a surface 12. Each surface 17 adds support for loads caused by torque input while maintaining a normal fit and manufacturing tolerance range. By doing so surface 17 reduces stress on each bending beam 14, thereby enhancing durability of each bending beam 14 and the toothed sprocket 7. Surface 17 does not engage groove 5 but instead engages outer surface 16 directly.

Figure 4:
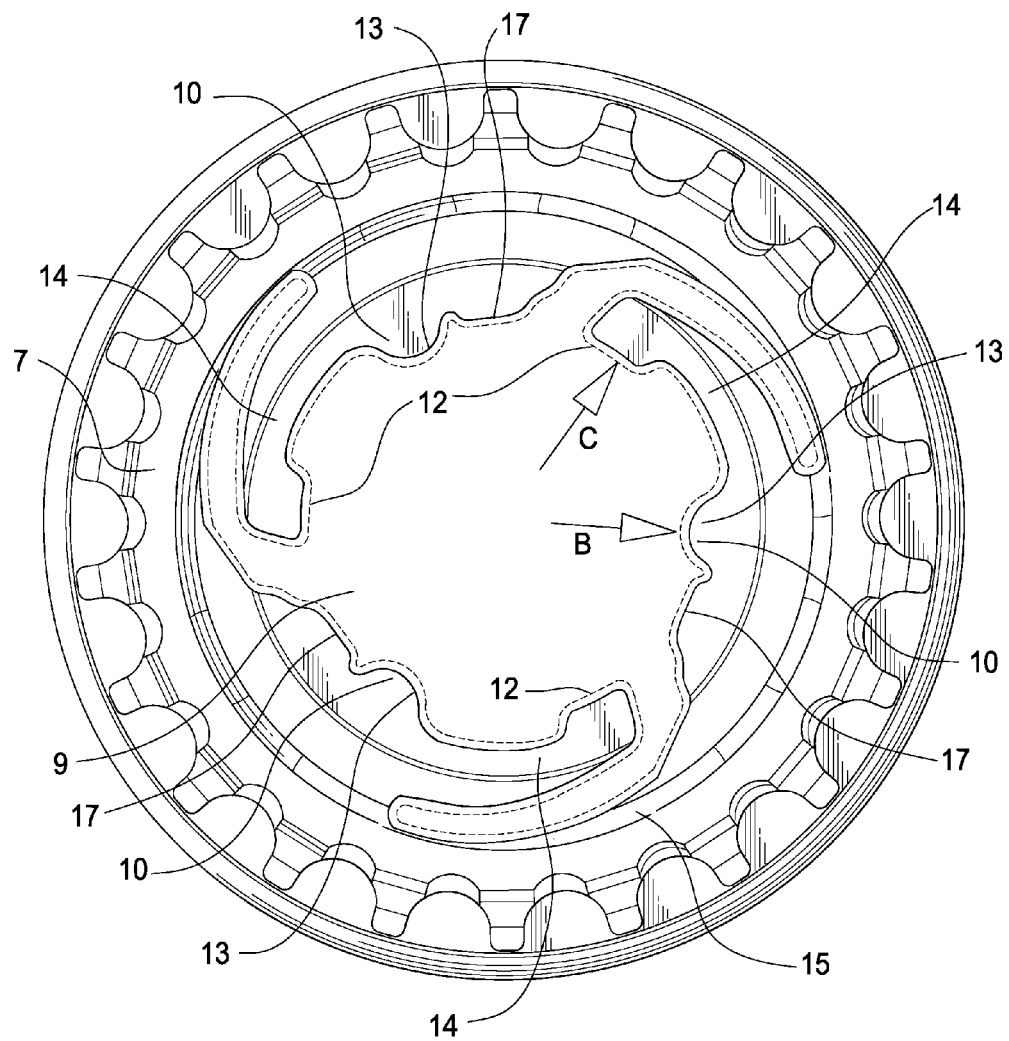
FIG. 4 shows a side view of a toothed sprocket.

FIG. 4 shows a side view of a toothed sprocket 7. Surfaces 13 of bore 9 are designed as a radial projection and are manufactured with a clearance fit relative to the grooves 5 of the input shaft 2. Spline shaft profile 15 is represented here by a dashed line. The entire surface of bore 9 does not contact the cylinder-shaped lateral surface 16 from FIG. 2. The profile circumference of the bore is approximately 25% larger than the surface of the shaft. In terms of radial deformability, surfaces 13 can be considered rigid and relatively inelastic. Here, the radial direction of movement of surfaces 13 is shown with an arrow "B". Surfaces 12 can be considered elastic in terms of radial deformability, because they are connected to the toothed sprocket 7 via bending beam 14. The radial direction of movement of the elastic surfaces 12 is shown with an arrow "C".

A toothed sprocket hub with elastic centering element comprising an input shaft having a receiving portion and a cylindrical outer surface, a sprocket engagable with the input shaft, the sprocket comprising at least two first surfaces each disposed on a bending beam such that each first surface is elastically moveable in a radial direction, the two first surfaces bearing upon the outer surface, the two first surfaces having a diameter that is less than a diameter of the outer surface, at least one second surface that is radially moveable to a lesser extent than a first surface, the second surface engaging the receiving portion to prevent a relative rotation of the sprocket upon the input shaft, and a third surface in cooperative relation to the second surface, the third surface bearing upon the outer surface of the input shaft, the third surface having a diameter greater than the diameter of the outer surface.

Figure 5:
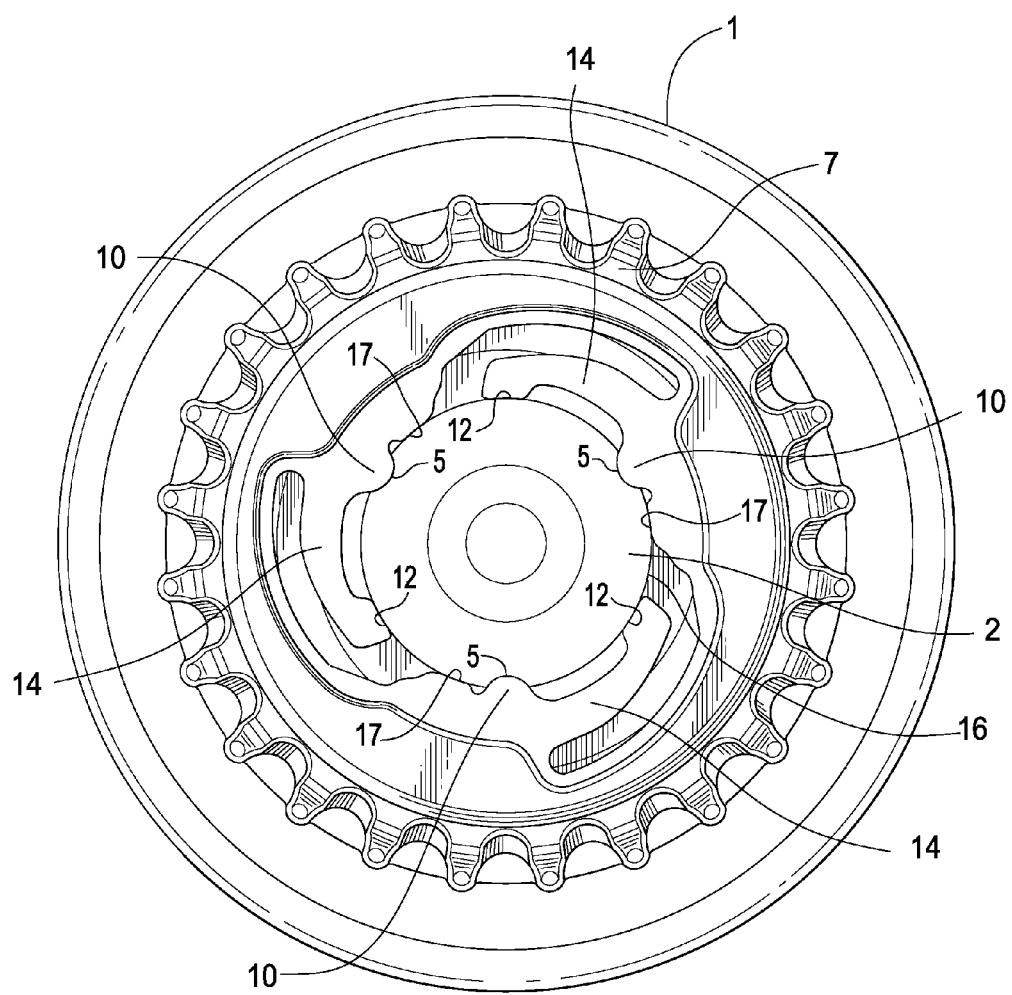
FIG. 5 is a side view of the sprocket on an input shaft.

FIG. 5 is a side view of the sprocket on an input shaft. In this view snap ring 6 is removed for clarity. Each projection 10 engages a receiving portion 5. Each projection 10 prevents sprocket 7 from rotating relative to the input shaft 2. Surface 12 and surface 17 each engage outer surface 16 of input shaft 2. Surface 12 and surface properly locate sprocket 7 on input shaft 2. Each surface 12 is moveable radially inward and outward due to the flexibility of each bending beam 14. This embodiment illustrates three bending beams 14 by way of example and not of limitation. This embodiment illustrates three surfaces 17 by way of example and not of limitation. This embodiment illustrates three receiving portions 5 and three projections 10 by way of example and not of limitation.

The inventive system is advantageous over splines because it relies on fewer receiving portions 5, which in turn reduces the expense and need for controlling close tolerances during manufacturing. Surfaces 12 and 17 are used for centering alignment with input shaft 2. This in turn relies upon the accuracy of outer surface 16 which is easily achieved in the art. The flexibility of each bending beam 14 allows absorption of greater and therefore less expensive manufacturing tolerances.

Although a form of the invention has been described herein, it will be obvious to those skilled in the art that variations may be made in the construction and relation of parts without departing from the spirit and scope of the invention described herein.

I claim:

1. A toothed sprocket hub with elastic centering element comprising:
    an input shaft having a receiving portion and a cylindrical outer surface;
    a sprocket engagable with the input shaft;
    the sprocket comprising at least two first surfaces each disposed on a bending beam such that each first surface is elastically moveable in a radial direction, the two first surfaces bearing upon the outer surface, the two first surfaces each having a radius (d) that is less than a radius (D) of the outer surface;
    at least one second surface that is radially moveable to a lesser extent than a first surface, the second surface engaging the receiving portion to prevent a relative rotation of the sprocket with the input shaft; and
    a third surface in cooperative relation to the second surface, the third surface bearing upon the outer surface of the input shaft, the third surface having a clearance fit with the outer surface.

2. The toothed sprocket as in claim 1, wherein each bending beam is oriented tangentially to the input shaft.

3. The toothed sprocket as in claim 1, wherein the receiving portion comprises a groove in the outer surface.

4. The toothed sprocket as in claim 1 further comprising at least three first surfaces, at least three second surfaces and at least three third surfaces.

5. The toothed sprocket as in claim 1, wherein the second surface is disposed between the first surface and the third surface.

6. The toothed sprocket as in claim 1 further comprising a retaining member for axially retaining the sprocket on the input shaft.

7. The toothed sprocket as in claim 1, wherein the second surface comprises a projection for engaging the receiving portion.

* * * * *